United States Patent [19]

Shiiki et al.

[11] 4,273,675

[45] Jun. 16, 1981

[54] PROCESS FOR THE PREPARATION OF SPHERICAL CARBON PARTICLES AND SPHERICAL ACTIVATED CARBON PARTICLES

[75] Inventors: Zenya Shiiki; Kazuhiro Watanabe, both of Iwaki, Japan

[73] Assignee: Kureha Kagaku Kogyo Kabushiki Kaisha, Tokyo, Japan

[21] Appl. No.: 62,299

[22] Filed: Jul. 31, 1979

[30] Foreign Application Priority Data

Aug. 11, 1978 [JP] Japan .................................. 53/97820

[51] Int. Cl.$^3$ .................. C01B 31/10; C01B 31/08; C01B 31/02; B01J 21/18
[52] U.S. Cl. ................................. 252/424; 252/421; 264/29.1; 423/449
[58] Field of Search ............... 252/421, 444, 445, 424; 423/445, 449, 460, 461; 264/29.1, 29.3, 29.5

[56] References Cited

U.S. PATENT DOCUMENTS

| | | | |
|---|---|---|---|
| Re. 29,101 | 1/1977 | Amagi et al. ........................ | 252/421 |
| 3,953,345 | 4/1976 | Saito et al. ........................... | 252/421 |
| 4,045,368 | 8/1977 | Katori et al. ......................... | 252/421 |
| 4,124,529 | 11/1978 | Jungten et al. ....................... | 252/421 |

FOREIGN PATENT DOCUMENTS

| | | |
|---|---|---|
| 610086 | of 0000 | United Kingdom . |
| 902118 | of 0000 | United Kingdom . |
| 987782 | of 0000 | United Kingdom . |
| 1114246 | of 0000 | United Kingdom . |
| 1383085 | of 0000 | United Kingdom . |

*Primary Examiner*—P. E. Konopka
*Attorney, Agent, or Firm*—Wegner & Bretschneider

[57] ABSTRACT

Disclosed herein is a process for producing spherical carbon particles in which a pitch or a heavy oil of a low softening point is mixed with an organic solvent to reduce the viscosity thereof and is fused and shaped into spherical particles. Added to the pitch or heavy oil is a material capable of elevating the softening point thereof which is selected from the group consisting of mononitro aromatic compounds, polynitro aromatic compounds, quinones and polycarboxylic acid anhydrides. Also mixed with the pitch is a material capable of preventing the formation of voids in the material, which may be fluid or solid paraffin, polyethylene, alicyclic hydrocarbons, alkylcyclohexanes, fatty alcohols and silicone oil.

8 Claims, No Drawings

PROCESS FOR THE PREPARATION OF SPHERICAL CARBON PARTICLES AND SPHERICAL ACTIVATED CARBON PARTICLES

BACKGROUND OF THE INVENTION

This invention relates to a process for preparing spherical carbon particles or spherical activated carbon particles from pitch or heavy oil, particularly those with a low softening point, or one below 150° C.

Heretofore, pitch-based spherical carbon particles or spherical activated carbon particles have been produced by using pitch having a higher softening point than the oxidization starting temperature (usually above 150° C.), shaping the pitch material into spherical particles, oxidizing said particles for infusibilizing same, and then carbonizing or activating the spherical particles.

However, pitch with a softening point of over 150° C. is of a special sort and usually not available commercially, so that such pitch is difficult to obtain and hence very expensive in comparison with ordinary commercial pitch. It is therefore unremunerative to produce spherical carbon particles or spherical activated carbon particles from such pitch.

The softening point of commercially available pitch is on the order of 40° to 80° C. while that of heavy oil (which means residue in refining petroleum such as asphalts, tars and oils of high boiling point, hereinafter) is usually not higher than 150° C. Such generally accessible pitch or heavy oil, therefore, is too low in softening point to serve immediately as material for the production of spherical carbon particles or spherical activated carbon particles.

Coal type pitch also causes difficulties in use as base material for activated carbon because spherical carbon particles prepared therefrom tend to develop cracks owing to high spherulitifying tendency of such pitch and also because the produced carbon is hard to activate.

This invention has been devised with the object of solving these problems in the prior art, and it is intended to provide a process which is capable of advantageously producing spherical carbon particles or spherical activated carbon particles by using the commercially available coal pitch or petroleum pitch with low softening point.

Other objects of this invention will become apparent from a review of the following detailed description of the invention.

DETAILED DESCRIPTION OF THE INVENTION

According to the process of this invention, there is first prepared a mixture having a softening point and viscosity best suited for forming the spherical particles by adding and admixing a material capable of modifying viscosity as well as a material capable of elevating softening point to commercially obtainable coal pitch or petroleum pitch with low softening point, such as "soft pitch", "medium pitch" or "high pitch", or a heavy oil such as natural asphalt, petroleum asphalt or solvent-extracted asphalt, and the thus obtained particles are worked into spherical carbon or spherical activated carbon.

It is to be noted that when said mixture is worked into the spherical products, voids may be formed in the inside of the worked products to make such products fragile mechanically. In view of this, the present invention comprises, in an embodiment thereof, addition of a material capable of preventing formation of such voids previous to the preparation of said mixture.

The material used for elevating the softening point of the coal or petroleum pitch or heavy oil in this invention may be selected from mononitro aromatic compounds such as nitrobenzene, nitrotoluene and nitrophenol; polynitro aromatic compounds such as dinitrobenzene, dinitrotoluene, dinitrophenol and tetranitromethane; quinones such as benzoquinone, naphthoquinone and toluquinone; and polycarboxylic anhydrides such as maleic anhydride and pyromellitic anhydride. Among these materials, nitrobenzene and dinitrobenzene are most preferred because they have not only an excellent action for elevating the softening point of said pitch and heavy oil but are also helpful for arresting mesophase-spherule formation of the pitch.

Such material used for elevating the softening point of pitch or heavy oil is preferably added in an amount of 0.2 to 20% by weight based on said pitch or heavy oil with low softening point. It should be noted that no satisfactory elevation of softening point is induced if the amount of said material added is in less than the above-defined range. Also, addition of said material in excess of 20% by weight is unadvisable for economical reasons.

The softening point elevating effect produced by the above-mentioned material on said pitch or heavy oil is considered ascribable to an oxidative polycondensation reaction that takes place when said material is added to said pitch or heavy oil and heated at a temperature within the range of 150° to 350° C.

The softening point of pitch or heavy oil to be used in this invention is not critical, but from the standpoint economy regarding requirement of material to be added, it is preferable that the above-stated softening point is higher than room temperature.

In the process of this invention, a viscosity modifier which improves transformability of pitch or heavy oil into spherical particles is added to the pitch or the heavy oil, in addition to said softening point elevating material. Such viscosity modifier is preferably an organic solvent which has good compatibility with pitch and heavy oil and has a boiling point of over 150° C. Examples of such organic solvents include the aromatic hydrocarbons such as durene, naphthalene, alkylnaphthalenes and biphenyl, chlorinated hydrocarbons such as trichlorobenzene and chloronaphthalene. Most preferred among these organic solvents is naphthalene because it has a pronounced viscosity modifying action for pitch and heavy oil and also facilitates extracting operation in the extraction treatment for making the spherical products porous.

Such viscosity modifier is preferably added in an amount of 5 to 50% by weight based on pitch or heavy oil. Any smaller amount of said viscosity modifier than the above-mentioned range can not provide required viscosity for working the pitch or heavy oil mixture into preferable spherical particles, while any greater amount than said range leads to excessively high porosity when the spherical particles obtained are extracted with a solvent, resulting in poor mechanical strength of the product.

The viscosityy modifier may be added and mixed in pitch or heavy oil either simultaneously with the softening point elevating material or after the softening point of pitch or heavy oil has been duly elevated.

In addition to the above-mentioned softening point elevating material and viscosity modifier, there may be also added a material which acts to make the spherical particles texture compact to eliminate the chance for formation of voids in the inside of the particles. Such material may be, for example, a higher aliphatic hydrocarbon such as fluid paraffin, solid paraffin or polyethylene; an alicyclic hydrocarbon such as decalin or alkylcyclohexane; a higher alcohol such as stearyl alcohol, lauryl alcohol or cetyl alcohol; or other material such as silicone oil. Formation of voids in the inside of the spherical product results in reduced mechanical strength thereof as afore-mentioned. The object of the use of the above-mentioned material, therefore, is to prevent such fragility of the product. Generally speaking, softening point elevating materials slightly tend to generate voids inside the spherical product. However, there is no need of using such material where there is no possibility that the voids are formed in the spherical product.

There is thus prepared a mixture by adding said softening point elevating material, viscosity modifier and, if need be, a material capable of preventing formation of voids in the formed product, to form a pitch or heavy oil with a low softening point, and then such mixture is shaped into spheres.

There are available several methods for working said mixture into spherical particles. For example, (1) a melt of the mixture is subjected to high-speed stirring in hot water containing a suspending agent so that said mixture is dispersed in the water phase and thereby formed into spheres; (2) a melt of the mixture is sprayed into a gaseous phase from a nozzle; and (3) the solidified mass of said mixture is pulverized and then charged in a disc-typed or drum-typed pelletizer at a high temperature to thereby shape the mixture into spheres. These methods have in common that the mixture is shaped into spherical particles while in a molten state and then solidified by cooling. Among these methods, the method (1) (in which the melt of the mixture is dispersed in water and shaped spherically) is most suited for obtaining the substantially true-spherical particles.

Then the above-stated viscosity modifier contained in the obtained spherical particles is extracted substantially selectively by using an extractant which scarcely extracts the pitch or heavy oil that is the principal constituent of the product. As the viscosity modifier in the particles is extracted by this extraction treatment, the particles become porous.

The porous structure of the spherical particles produced by the extraction treatment proves helpful for elevating the softening point of the particles to a level higher than the oxidation starting temperature (usually above 150° C.) and for uniformly distributing the oxidizer throughout the structure of the particles in the infusibilization step.

The extractant used in the extraction treatment may be a lower aliphatic hydrocarbon such as hexane, heptane, cyclohexane, naphtha or kerosine, or a lower aliphatic alcohol such as methanol or ethanol. A usual method may be used for performing extraction of the spherical particles by using the extractant.

The porous spherical particles obtained from the extraction treatment are then infusibilized by oxidizing same with an oxidizer at a temperature below 400° C. Such infusibilization of the porous spherical particles by use of the oxidizer is effective for elevating the softening point of pitch or heavy oil by polycondensing it and for involatilizing the volatile components of pitch or heavy oil by polycondensing such components to increase the rate of carbonization.

The oxidizer used for infusibilizing the porous spherical particles in this invention may be of any ordinarily used type such as oxygen, ozone, sulfur trioxide gas ($SO_3$), nitrogen dioxide, chlorine or air. It is also possible to use an oxidative fluid such as sulfuric acid, phosphoric acid, nitric acid, chromic acid solution, permanganic acid solution, peroxide solution or hypochlorous acid solution. Among these oxidizers, ozone, sulfur trioxide gas, nitrogen dioxide and chlorine may be used in the form of a mixed gas diluted with air or nitrogen. Also, these oxidizers may be used either singly or in combination. The infusibilization treatment is performed at a temperature lower than the softening point of the porous product and below 400° C. as said before. In practice of this treatment, the softening point of the porous spherical particles rises in accordance with advancement of the infusibilization treatment, so that it is advisable to gradually increase the infusibilization treatment temperature in line with the rise of softening point as this allows a sizable reduction of time required for the treatment.

The infusibilized porous spherical particles are then calcined in an inert atmosphere at a temperature above 600° C. thereby carbonizing same to obtain spherical carbon particles. Activated spherical carbon particles can also easily be obtained by either directly activating the infusibilized spherical particles or by activating the spherical carbon particles with an activator mainly composed of oxygen or steam.

As described above, it is possible according to this invention to advantageously produce a porous spherical product with low degree of mesophase-spherule formation from commercially available coal pitch or petroleum pitch with relatively low softening point and heavy oil which have been unusable, in the form as they are, as the material for production of spherical carbon or spherical activated carbon.

The porous spherical carbon particles obtained by carbonizing said porous spherical particles prove particularly useful as carbonaceous filler for specific uses. Also, spherical activated carbon particles, obtained by activating the spherical particles shaped into small globules or by activating spherical carbon particles obtained by carbonizing the carbon particles, have very excellent quality and performance.

The present invention is now described in further detail by way of some embodiments thereof, but it should be understood that the scope of this invention is not limited by these embodiments.

EXAMPLE 1

Each of the coal pitch, petroleum pitch and natural asphalt specimens (Specimen Nos. 1 to 4), having the softening points shown in Table 1 below, was blended with a material capable of elevating their softening point, a material capable of modifying their viscosity and a material capable of arresting formation of voids in the spherically shaped product in the amounts shown in Table 1, and each of the thus prepared mixtures was formed into a porous spherical form in the following way.

One hundred kg of each mixture was fed into a 500 liter-capacity autoclave with stirring blades and heated at 260° C. under stirring for one hour to effect rise of the softening point of the specimen. After this softening point elevating treatment, the content was cooled to 150° C., added to 350 kg of a 0.3% aqueous solution of saponified polyvinyl acetate (saponification degree: 88%), stirred at high speed (280 r.p.m.) at the same temperature for 20 minutes to disperse the mixture in the water phase, and then cooled down to 40° C. to obtain a slurry of spherical composition. The obtained spherical pitch or asphalt composition was filtered, dehydrated and then stirred in approximately 10 times as much amount of n-hexane for one hour to extract the viscosity modifier in said composition. After repeating the above operation twice, the composition was air-dried to obtain porous spheres. The softening points of the thus obtained respective porous spherical preforms are also shown in Table 1. (The pitch and asphalt porous preforms obtained in the manner described above are hereinafter referred to as R-1, R-2, R-3 and R-4, respectively).

TABLE 1

| Specimen No. | | 1 | 2 | 3 | 4 |
|---|---|---|---|---|---|
| Starting material | Type | Coal pitch | Coal pitch | Petroleum pitch | Natural asphalt |
| | Softening point | 48° C. | 72° C. | 80° C. | 120° C. |
| | Charge | 71 Kg | 66 Kg | 72 Kg | 62 Kg |
| Additives | Softening point elevating agent Type | m-dinitro-benzene | Benzo-quinone | m-dinitro-benzene | Maleic anhydride |
| | Charge | 3 Kg | 8 Kg | 2 Kg | 8 Kg |
| | Viscodity modifier Type | Nephthalene | Methylna-phthalene | Naphtha-lene | Durene |
| | Charge | 25 Kg | 25 Kg | 25 Kg | 30 Kg |
| | Void preventing agent Type | Solid paraffin | Poly-ethylene | Stearyl alcohol | None |
| | Charge | 1 Kg | 1 Kg | 1 Kg | — |
| Porous spheres of pitch and asphalt | Softening point | 205° C. | 190° C. | 215° C. | 185° C. |
| | Reference symbol | R-1 | R-2 | R-3 | R-4 |

Note:
The softening point was measured by using a flow tester. (Test sample: 1 g; 10 Kg/cm$^2$; rate of temperature increase: 6° C./min).

A part of each of the porous spherical preforms R-2 to R-4 was calcined by heating from room temperature to 1000° C. at the heating rate of 250° C./h in a nitrogen atmosphere to obtain spherical carbon. The properties of the obtained spherical carbon products are shown in Table 2 below.

TABLE 2

| Symbol | R-2 | R-3 | R-4 |
|---|---|---|---|
| Shape | Sphere | Sphere | Sphere |
| Surface cracks | None | None | None |
| Spherulite (vol %) | <10 | <10 | <10 |
| Voids | Trace | Trace | Slight |
| Average grain size (mm) | 0.52 | 0.48 | 0.45 |
| Surface area (m$^2$g)*1 | — | — | — |
| I$_2$ adsorption (mg/g)*2 | — | — | — |

*1 Measured by nitrogen adsorption B.E.T. method.
*2 Adsorption per 1 gr of activated carbon at equilibrium density of 1 g/l obtained from the isothermic adsorption lines.

A part of each of the porous spherical preforms R-1 to R-4 was heated to 900° C. at the heating rate of 250° C./h in a nitrogen gas stream by using a fluidized bed, and after switching gas into steam, the preform was maintained in a steam stream for 2 hours to effect steam activation, thereby obtaining activated carbon. The properties of the thus obtained activated carbon products are shown in Table 3 below.

TABLE 3

| Symbol | R-1 | R-2 | R-3 | R-4 |
|---|---|---|---|---|
| Shape | Spherical | Spherical | Spherical | Spherical |
| Surface cracks | None | None | None | None |
| Spherulite (vol %) | <10 | <10 | <10 | <10 |
| Voids | Trace | Trace | Trace | Slight |
| Average grain size (mm) | 0.48 | 0.50 | 0.47 | 0.42 |
| Surface area (m$^2$/g)*1 | 1000 | 1100 | 1200 | 960 |
| I$_2$ adsorption (mg/g)*2 | 960 | 1010 | 1050 | 950 |

*1 Measured by nitrogen adsorption B.E.T. method.
*2 Adsorption per 1 gr of activated carbon at equilibrium density of 1 g/l obtained from the isothermic adsorption lines.

EXAMPLE 2

Each of the coal pitch and solvent-extracted asphalt specimens (Specimen Nos. 5 to 8) having the softening points shown in Table 4 was blended with a material capable of increasing their softening point in an amount shown in the same table, and each of the thus prepared mixtures was fed into an autoclave same as used in Example 1 and heated at 240° C. under stirring for 5 hours to perform a softening point elevating treatment. The thus treated pitch and asphalt specimens had the softening points shown in Table 4.

TABLE 4

| Specimen No. | | 5 | 6 | 7 | 8 |
|---|---|---|---|---|---|
| Starting material | Type | Coal pitch | Coal pitch | Coal pitch | Solvent-extracted asphalt |
| | Sftn. point | 80° C. | 80° C. | 80° C. | 50° C. |
| | Charge | 98 kg | 96 kg | 94 kg | 90 kg |
| Softening point elevating material | Type | m-dini-tro-benzene | m-dini-tro-benzene | m-dini-tro-benzene | Benzo-quinone |
| | Charge | 2 kg | 4 kg | 6 kg | 10 kg |
| Treated pitch and asphalt | Sftn. point | 150° C. | 175° C. | 205° C. | 160° C. |
| | Symbol | P-5 | P-6 | P-7 | P-8 |

A part of the thus treated pitch and asphalt specimens (elevated in softening point) was sampled out and added with a material capable of modifying viscosity and a material capable of preventing formation of voids in the preform in amounts shown in Table 5 below.

Each of the thus prepared mixtures was fed into an autoclave same as used in the preceding examples, stirred at 160° C. for one hour to fuse and mix the materials and then dispersed in the water phase at 150° C. according to the same procedure as Example 1, and the resultant dispersed particles were extracted in the same way as Example 1 to obtain porous spheres of said pitch and asphalt. (The thus obtained porous spherical preforms of pitch and asphalt are hereinafter referred to as R-9, R-10, R-11 and R-12, respectively).

TABLE 5

| Specimen No. | | 9 | 10 | 11 | 12 |
|---|---|---|---|---|---|
| Treated pitch and asphalt | Symbol | P-5 | P-6 | P-7 | P-8 |
| | Charge | 74 kg | 74 kg | 75 kg | 69 kg |
| Viscosity modifier | Type | Naphthalene | Naphthalene | Methylnaphthalene | Durene |
| | Charge | 25 kg | 25 kg | 25 kg | 30 kg |
| Additives Void preventing material | Type | Polyethylene | Solid paraffin | None | Polyethylene |
| | Charge | 1 kg | 1 kg | — | 1 kg |
| Porous spheres of pitch and asphalt | Sftn. point | 181° C. | 210° C. | 225° C. | 195° C. |
| | Symbol | R-9 | R-10 | R-11 | R-12 |

A part of the thus obtained porous spherical pitch and asphalt preforms R-9 to R-12 was subjected to the same carbonization and activation treatments as practiced in Example 1 to obtain spherical carbon and activated spherical carbon. These carbon products had the properties shown in Tables 6 and 7 below.

TABLE 6

| (Properties of spherical carbon) | | | | |
|---|---|---|---|---|
| Symbol | R-9 | R-10 | R-11 | R-12 |
| Shape | Spherical | Spherical | Spherical | Spherical |
| Surface cracks | None | None | None | None |
| Voids | Trace | Trace | Slight | Trace |
| Spherulite (vol %) | <10 | <10 | <10 | <10 |
| Average particle size (mm) | 0.49 | 0.52 | 0.55 | 0.47 |
| Surface area (m²g/) | — | — | — | — |
| I₂ adsorption (mg/g) | — | — | — | — |

TABLE 7

| (Properties of spherical activated carbon) | | | | |
|---|---|---|---|---|
| Symbol | R-9 | R-10 | R-11 | R-12 |
| Shape | Spherical | Spherical | Spherical | Spherical |
| Surface cracks | None | None | None | None |
| Voids | Trace | Trace | Slight | Trace |
| Spherulite (vol %) | <10 | <10 | <10 | <10 |
| Average particle size (mm) | 0.47 | 0.50 | 0.52 | 0.44 |
| Surface area (m²/g) | 1000 | 1200 | 1100 | 970 |
| I₂ adsorption (mg/g) | 920 | 1100 | 1000 | 890 |

EXAMPLE 3

Each of 72 kg of ethylene-bottom oil and 45 kg of coal pitch having the softening point 74° C. was mixed with 4 kg and 5 kg of nitrobenzenes, respectively, and the resultant respective mixture was fed into a 500 liter-capacity autoclave with stirring blades and heated at 240° C. under stirring for five hours, respectively. The thus obtained ethylene-bottom oil mixture showed the softening point of 164° C. and the obtained coal pitch mixture an elevated softening point of 150° C.

Thirty grams of the ethylene-bottom oil mixture was mixed with 16 kg of naphthalene and 0.3 kg of polyethylene and thirty grams of the coal pitch mixture with 16.2 kg of naphthalene and 0.45 kg of solid paraffin, respectively.

Each of the resultant mixtures was fed into the same autoclave as stated above, and heated at 160° C. under stirring to fuse same, respectively.

After the fusing treatment, each of 120 kg of a 0.3% aqueous solution of saponified polyvinyl acetate (saponification degree: 88%) was fed into the content in the autoclave, and stirred at a speed of 280 r.p.m. at 150° C. for 20 minutes to disperse the mixture in the water phase, respectively.

Each of the thus obtained spherical ethylene-bottom oil and coal pitch compositions was extracted with n-hexane according to the same procedures as described in Example 1 to obtain porous spheres.

The thus obtained porous spheres were heated up to 900° C. at the heating rate of 250° C./h in a nitrogen gas stream by using a fluidized bed, and after switching the gas to steam, the porous spheres were maintained in a steam stream for two hours to effect activation by steam thereby obtaining activated carbon particles.

The characteristic properties of the obtained activated carbon particles are shown in Table 8.

TABLE 8

| | Starting material | |
|---|---|---|
| Symbol | Ethylene-bottom oil | Coal pitch |
| Shape | Spherical | Spherical |
| Surface cracks | None | None |
| Spherulite (% by vol) | <10 | <10 |
| Voids | Trace | Trace |
| Average grain size (mm) | 0.80 | 0.80 |
| Surface area (m²/g) | 1150 | 1200 |
| I₂ adsorption (mg/g) | 1130 | 1140 |

EXAMPLE 4

Seventy-two parts by weight of coal pitch with softening point of 43° C., 8 parts by weight of m-dinitrobenzene (softening point elevating agent) and 20 parts by weight of naphthalene (viscosity modifier) were mixed, and the mixture was fed into an autoclave, stirred therein at 260° C. for 3 hours to increase the softening point of said coal pitch, then extruded from a 0.4 mm-diameter nozzle at a temperature of 180° C. and dropped gravitationally in a cylinder of 2 m-diameter and 5 m length into n-hexane to obtain approximately 0.9 mm spheres, and these spheres were extracted with n-hexane to obtain spherical porous bodies with softening point of 205° C.

These porous bodies were treated similarly to Example 1 to obtain substantially spherical activated carbon with spherulite content of less than 10%, average particle size of 0.81 mm, surface area of 1,000 m$^2$/g and I$_2$ adsorption of 980 mg/g.

What is claimed is:

1. A process for producing spherical carbon particles, wherein a pitch or a heavy oil of a softening point below 150° C. is mixed with an organic solvent to reduce the viscosity thereof, the mixture is fused and shaped into spherical particles, said organic solvent in said spherical particles is extracted with a solvent incapable of dissolving said pitch or heavy oil but capable of dissolving said organic solvent to obtain porous spherical particles, the thus obtained porous spherical particles are subjected to a treatment of infusibilization in an oxidizing atmosphere whereafter the thus infusibilized particles are carbonized, characterized in that at least one material capable of elevating said softening point of said pitch or heavy oil and selected from the group consisting of mononitro aromatic compounds, polynitro aromatic compounds, quinones and polycarboxylic acid anhydrides, and a material capable of preventing the formation of voids within said particles and selected from the group consisting of fluid paraffin, solid paraffin, polyethylene, alicyclic hydrocarbons, alkylcyclohexanes, stearyl alcohol, lauryl alcohol, cetyl alcohol, and silicone oil, are mixed with said pitch or heavy oil thereby to elevate the softening point of said pitch or heavy oil and to prevent said formation of voids within said spherical particles.

2. A process according to claim 1, wherein said material capable of elevating said softening point of said pitch or heavy oil is used in an amount of 0.2 to 20% by weight based on said pitch or heavy oil.

3. A process according to claim 2, wherein said material capable of elevating said softening point is nitrobenzene.

4. A process according to claim 2, wherein said material capable of elevating said softening point is dinitrobenzene.

5. A process for producing spherical activated carbon particles, wherein a pitch or heavy oil of a softening point below 150° C. is mixed with an organic solvent to reduce the viscosity thereof, the mixture is fused and shaped into spherical particles, said organic solvent in said spherical particles is extracted with a solvent incapable of dissolving said pitch or heavy oil but capable of dissolving said organic solvent to obtain porous spherical particles, the thus obtained porous spherical particles are subjected to a treatment of infusibilization in an oxidizing atmosphere, carbonizing the thus infusibilized particles, whereafter the thus carbonized particles are activated, characterized in that, at least one material capable of elevating said softening point of said pitch or heavy oil and selected from the group consisting of mononitro aromatic compounds, polynitro aromatic compounds, quinones and polycarboxylic acid anhydrides, and a material capable of preventing the formation of voids within said particles and selected from the group consisting of fluid paraffin, solid paraffin, polyethylene, alicyclic hydrocarbons, alkylcyclohexanes, stearyl alcohol, lauryl alcohol, cetyl alcohol, and silicone oil, are mixed with said pitch or heavy oil thereby to elevate the softening point of said pitch or heavy oil and to prevent said formation of voids within said spherical particles.

6. A process according to claim 5, wherein said material capable of elevating said softening point of said pitch or heavy oil is used in an amount of 0.2 to 20% by weight based on said pitch or heavy oil.

7. A process according to claim 6, wherein said material capable of elevating said softening point is nitrobenzene.

8. A process according to claim 6, wherein said material capable of elevating said softening point is dinitrobenzene.

* * * * *